US012009736B2

(12) United States Patent
Lin et al.

(10) Patent No.: US 12,009,736 B2
(45) Date of Patent: Jun. 11, 2024

(54) METHOD AND APPARATUS OF ADJUSTING PARAMETER FOR ELECTRICAL DEVICE (71) Applicant: TRIDONIC GMBH & CO KG, Dornbirn (AT)

(72) Inventors: Yaofeng Lin, Guangdong (CN); Xinhai Li, Guangdong (CN); Zongjie Wu, Guangdong (CN)

(73) Assignee: Tridonic GmbH & Co KG, Dornbirn (AT)

( * ) Notice: Subject to any disclaimer, the term of this patent is extended or adjusted under 35 U.S.C. 154(b) by 546 days.

(21) Appl. No.: 17/281,630

(22) PCT Filed: Oct. 26, 2018

(86) PCT No.: PCT/CN2018/112039
§ 371 (c)(1),
(2) Date: Mar. 31, 2021

(87) PCT Pub. No.: WO2020/082324
PCT Pub. Date: Apr. 30, 2020

(65) Prior Publication Data
US 2021/0399623 A1  Dec. 23, 2021

(51) Int. Cl.
H05B 45/30 (2020.01)
H02M 1/00 (2006.01)
(Continued)

(52) U.S. Cl.
CPC ........... H02M 1/12 (2013.01); H02M 1/0048 (2021.05); H02M 1/4225 (2013.01)

(58) Field of Classification Search
CPC ...... H05B 45/36; H05B 45/38; H05B 45/355; H05B 45/382; H05B 45/395; H02M 1/12;
(Continued)

(56) References Cited

U.S. PATENT DOCUMENTS 7,915,837 B2 * 3/2011 Shloush ................. H05B 41/28
315/307
9,197,132 B2 * 11/2015 Artusi ................. H02M 1/4225
(Continued)

FOREIGN PATENT DOCUMENTS

CN         1702948      11/2005
CN       107637179       1/2018
(Continued)

OTHER PUBLICATIONS

International Search Report dated Jul. 10, 2019 in parent PCT application PCT/CN2018/112039.

Primary Examiner — Tung X Le
(74) Attorney, Agent, or Firm — Andrus Intellectual Property Law, LLP (57) ABSTRACT A method and apparatus of adjusting parameter for an electrical device. The method of adjusting parameter for an electrical device, the electrical device comprising a converter, the method including: calculating a performance evaluation parameter of the electrical device, when the converter using a parameter value table for running; adjusting at least one parameter value in the parameter value table of the converter according to an input parameter so as obtain the optimized performance evaluation parameter of the electrical device and use the adjusted parameter value table corresponding to the optimized performance evaluation parameter for running. Therefore, the self adapting parameter in the table will be enable to find the best performance for different input and load conditions and better performance of Harmonics will not limit the operation range.

14 Claims, 5 Drawing Sheets (51) Int. Cl.
*H02M 1/12* (2006.01)
*H02M 1/42* (2007.01)

(58) Field of Classification Search
CPC . H02M 1/0003; H02M 1/4208; H02M 1/4225
See application file for complete search history.

(56) References Cited

U.S. PATENT DOCUMENTS

| | | | |
|---|---|---|---|
| 11,695,343 B2 * | 7/2023 | Balakrishnan | H02M 3/33507 363/21.14 |
| 2009/0234512 A1 * | 9/2009 | Ewing | G05B 15/02 700/295 |
| 2010/0026208 A1 * | 2/2010 | Shteynberg | H05B 45/3725 315/297 |
| 2010/0181935 A1 * | 7/2010 | Wu | H05B 41/3921 315/307 |
| 2011/0251807 A1 * | 10/2011 | Rada | G01D 4/00 702/61 |
| 2013/0003430 A1 * | 1/2013 | Reddy | H02M 3/01 363/74 |
| 2014/0361698 A1 | 12/2014 | Pereira | |
| 2016/0323953 A1 * | 11/2016 | DeJonge | H02M 3/33507 |
| 2018/0177023 A1 | 6/2018 | Li et al. | |

FOREIGN PATENT DOCUMENTS

| | | |
|---|---|---|
| CN | 108370636 | 8/2018 |
| CN | 1086673121 | 10/2018 |
| WO | 2013152370 | 10/2013 |

* cited by examiner

METHOD AND APPARATUS OF ADJUSTING PARAMETER FOR ELECTRICAL DEVICE

CROSS REFERENCE TO RELATED APPLICATION

The present application is the U.S. national stage application of international application PCT/CN2018/112039 filed Oct. 26, 2018, which international application was published on Apr. 30, 2020 as International Publication WO 2020/082324 A1.

TECHNICAL FIELD

Embodiments of the present disclosure generally relate to the field of electrical device, and more particularly, to a method and apparatus of adjusting parameter for an electrical device.

BACKGROUND

This section introduces aspects that may facilitate better understanding of the present disclosure. Accordingly, the statements of this section are to be read in this light and are not to be understood as admissions about what is in the prior art or what is not in the prior art.

Nowadays, electrical device such as LED drivers are widely used in various fields. With a LED driver, the luminescent intensity of a light-emitting means may be adjusted in a wide range.

A converter is usually included in the electrical device used to provide constant current for the light-emitting means. The LED converter may be a switched converter (boost converter). A circuit topology of the converter which is based on the topology of a boost converter. In this case, an inductance or coil to which a rectified AC voltage is supplied is charged with energy or discharged by a controllable switch being switched on and off. The discharge current of the inductance flows via a diode to an output capacitance, with the result that a DC voltage which is higher than the input voltage can be tapped off at the output.

The boost converter can have a control device which controls the current consumption. For this purpose, for example, the $T_{on}$ time for which the switch is switched in each case into the on state in order to store energy in the coil can be set, or for example, the control device may set an additional interval $T_{on\text{-}add}$ time by which the $T_{on}$ time is extended to have better performance.

SUMMARY

Inventors of this disclosure found that the above existing method exists problems below: the converter may preset and store a table which includes a plurality of additional intervals, e.g. $T_{on\text{-}add}$ corresponding to different input voltage. But the table is fixed for the converter during development for all load conditions. The performance may be bad at some loads and bad performance of Harmonics will limit the operation range.

One of the solutions is to manually adjust the parameter value in the table under different load conditions, but this solution is time consuming during development.

In general, embodiments of the present disclosure provide a method and apparatus of adjusting parameter for an electrical device, and an electrical device. In the embodiments, the electrical device can self-adapt adjust the above mentioned table. Therefore, the self adapting parameter in the table will be enable to find the best performance for different input and load conditions and better performance of Harmonics will not limit the operation range.

In a first aspect, there is provided method of adjusting parameter for an electrical device, the electrical device including a converter, the method including: calculating a performance evaluation parameter of the electrical device, when the converter using a parameter value table for running; adjusting at least one parameter value in the parameter value table of the converter according to an input parameter so as obtain the optimized performance evaluation parameter of the electrical device and use the adjusted parameter value table corresponding to the optimized performance evaluation parameter for running.

In an embodiment, the performance evaluation parameter including at least one of Power Factor (PF), Total Harmonic Distortion (THD) and Harmonics value.

In an embodiment, the converter including a switching means which is coupled to an inductance, used for charging and discharging the inductance, wherein, the switching means is switched to an on state for a $T_{on}$ time, and the $T_{on}$ time is dependent on the parameter value.

In an embodiment, the input parameter including at least one of input power, input voltage and input frequency.

In an embodiment, the parameter value table including a plurality of parameter values corresponding to different input voltages respectively.

In an embodiment, the method further includes: determining whether the input parameter changes; and, calculating a performance evaluation parameter and adjusting at least one parameter value in the parameter value table when the input parameter changes.

In an embodiment, the step of adjusting at least one parameter value in the parameter value table of the converter according to an input parameter so as obtain the optimized performance evaluation parameter of the electrical device further includes: adjusting at least one parameter value in the parameter value table of the converter into different values; calculating the corresponding performance evaluation parameters of the electrical device, if the converter using the different adjusted parameter values for running; comparing the corresponding performance evaluation parameters and the performance evaluation parameter before adjusting and obtaining the optimized performance evaluation parameter; updating the parameter value table with the adjusted parameter value which corresponds to the optimized performance evaluation parameter.

In an embodiment, the method further includes: recording the adjusted at least one parameter value in the parameter value table.

In a second aspect, there is provided an apparatus of adjusting parameter for an electrical device, the electrical device including a converter, the apparatus including: a metering circuit configured to calculate a performance evaluation parameter of the electrical device, when the converter using a parameter value table for running; a control unit configured to at least one parameter value in the parameter value table of the converter according to an input parameter so as obtain the optimized performance evaluation parameter of the electrical device and use the adjusted parameter value table corresponding to the optimized performance evaluation parameter for running.

In an embodiment, the performance evaluation parameter including at least one of Power Factor (PF), Total Harmonic Distortion (THD) and Harmonics value.

In an embodiment, the converter including a switching means which is coupled to an inductance, used for charging and discharging the inductance, wherein, the switching means is switched to an on state for a $T_{on}$ time, and the $T_{on}$ time is dependent on the parameter value.

In an embodiment, the input parameter including at least one of input power, input voltage and input frequency.

In an embodiment, the parameter value table including a plurality of parameter values corresponding to different input voltages respectively.

In an embodiment, the control unit further configured to determine whether the input parameter changes and calculate a performance evaluation parameter and adjust at least one parameter value in the parameter value table when the input parameter changes.

In an embodiment, when the control unit adjusts at least one parameter value in the parameter value table of the converter into different values, the metering circuit further configured to calculate the corresponding performance evaluation parameters of the electrical device, if the converter using the different adjusted parameter values for running; then the control unit further configured to compare the corresponding performance evaluation parameters and the performance evaluation parameter before adjusting and obtain the optimized performance evaluation parameter; wherein, the converter then updates the parameter value table with the adjusted parameter value which corresponds to the optimized performance evaluation parameter and uses the updated parameter value table for running.

In an embodiment, the control unit further configured to record the adjusted at least one parameter value in the parameter value table.

In a third aspect, there is provided an electrical device, including: the apparatus according to the second aspect; a converter configured to provide constant current.

In an embodiment, the electrical device is a LED driver.

According to various embodiments of the present disclosure, the electrical device can self-adapt adjust the above mentioned table. Therefore, the self adapting parameter in the table will be enable to find the best performance for different input and load conditions and better performance of Harmonics will not limit the operation range.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In the present disclosure, the electrical device may be any type of electrical devices. Such as a driver for a light-emitting means, or drivers for other fields.

First Embodiment

A method of abnormal efficiency protection for an electrical apparatus. The electrical apparatus includes a converter.

Figure 1:
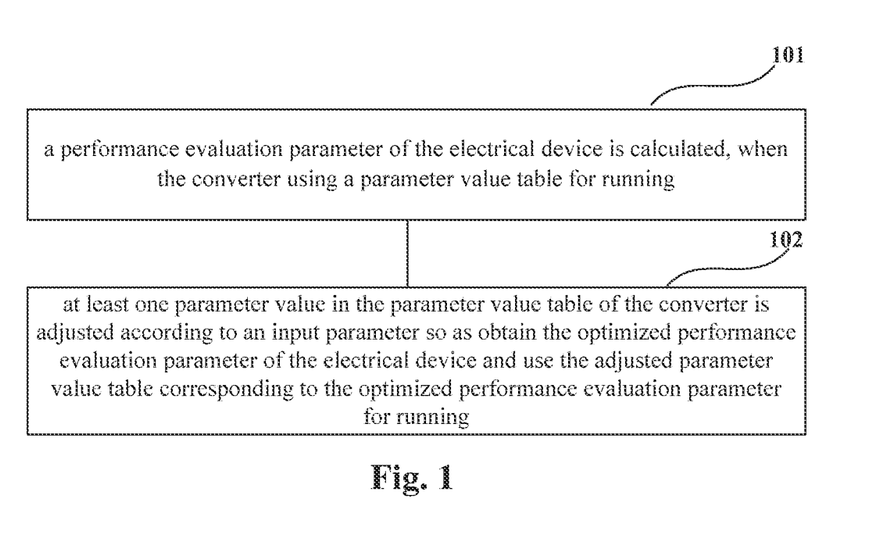
FIG. 1 is a flowchart of a method of adjusting parameter for an electrical device with an embodiment of the present disclosure.

FIG. 1 is a flowchart of a method of adjusting parameter for an electrical device with an embodiment of the present disclosure. As shown in FIG. 1, the electrical device comprising a converter, the method includes:

block 101, a performance evaluation parameter of the electrical device is calculated, when the converter using a parameter value table for running;

block 102, at least one parameter value in the parameter value table of the converter is adjusted according to an input parameter so as obtain the optimized performance evaluation parameter of the electrical device and use the adjusted parameter value table corresponding to the optimized performance evaluation parameter for running.

In an embodiment, the electrical device is used for a light-emitting means, for example, a gas discharge lamp, a fluorescent lamp or another fluorescent light-emitting means or LEDs. The electrical device may be a driver to receive dimming commands and/or output current and voltage to drive the light-emitting means, and adjust the luminescent intensity of a light-emitting means.

In an embodiment, the electrical device includes a converter configured to provide constant current and voltage, the converter may be a switched converter clocked at high frequency, such as a boost converter, includes a switching means which is coupled to an inductance, used for charging and discharging the inductance. The switching means is a controllable electronic switch, which may be a circuit breaker and which may be in the form of a field-effect transistor (FET), in particular in the form of a MOSFET, for example. The switching means is switched into the on state and the off state. In the switched-on state, the inductance is connected to ground via the switching means, with the result that the inductance is charged and energy is stored in the inductance. If, on the other hand, in the switched-off state, with the result that the inductance can discharge into the output filter capacitor and the energy stored in the inductance is transferred to the output filter capacitor. Functions and circuit configuration of the converter may be similar to those of the prior art, which shall not be described herein any further.

In an embodiment, the switching means is switched to an on state for a $T_{on}$ time in order to store energy in the inductance, and the $T_{on}$ time is dependent on the parameter value, the parameter value can be, for example, the time period of an additional interval by which the $T_{on}$ time is extended in each case. The $T_{on}$ time can be extended by the parameter value (an additional interval $T_{on-add}$) whose duration is dependent both on the present value of the input voltage. As a result, an extension of the $T_{on}$ time ($T_{on-add}$) which defines a correction term for the $T_{on}$ time and is used for further reducing harmonics can take place differently for the same input voltage depending on whether the input voltage increases or decreases.

In an embodiment, the converter may preset and store a parameter value table ($T_{on-add}$ table). The parameter value table includes a plurality of parameter values corresponding to different input voltages respectively. The table can be set in such a way that the time period $T_{on-add}$ of the additional interval by which the $T_{on}$ time is extended is greater when the input voltage increases than when the input voltage decreases, for a given value of the input voltage. For example, the input voltage may be divided into N segments, and set one $T_{on-add}$ for one segment. The parameter value table stores the corresponding relationship between the $T_{on-add}$ and the input voltage. The converter uses a stored parameter value table for running, determines the $T_{on-add}$ by a table scan using the present value of the input voltage and determines the $T_{on}$ time is dependent on the parameter value ($T_{on-add}$).

In a prior art, the parameter value table is fixed for the converter during development. In the present disclosure, the electrical device can self-adapt adjust the above mentioned table. Therefore, the self adapting parameter in the table will be enable to find the best performance for different input and load conditions and better performance of Harmonics will not limit the operation range.

In an embodiment, parameter adjusting process is an iterative loop process and block 101 and 102 are performed by several times until obtaining the optimized performance evaluation parameter of the electrical device.

In an embodiment, in block 101, when the converter using a parameter value table for running, a performance evaluation parameter of the electrical device is calculated. For example, the performance evaluation parameter includes at least one of Power Factor (PF), Total Harmonic Distortion (THD) and Harmonics value. The meaning of the Power Factor (PF), Total Harmonic Distortion (THD) and Harmonics value may refer to the prior art, which shall not be described herein any further.

In an embodiment, power metering is integrated in the converter. That means the performance evaluation parameter, for example, Power Factor (PF), Total Harmonic Distortion (THD) and Harmonics value can be calculated by the power metering integrated circuit. The performance evaluation parameter calculating method of the power metering integrated circuit may refer to the prior art, which shall not be described herein any further.

In an embodiment, the method further includes: determining whether the input parameter changes (not shown in the figures); and, blocks 101-102 are performed when the input parameter changes.

In an embodiment, the input parameter includes at least one of input power, input voltage and input frequency. That means, determining whether at least of input power and/or input voltage and/or input frequency changes, when the determined result is not changed, the converter still uses the current parameter value table for running, when the determined result is changed, blocks 101-102 are performed to find best performance evaluation parameter for the current input and load condition. That means, when the determined result is changed, performance evaluation parameter is calculated again, if the new performance evaluation parameter is worse than the original performance evaluation parameter, at least one parameter value in the parameter value table of the converter is adjusted according to an input parameter so as obtain the optimized performance evaluation parameter of the electrical device.

Figure 2:
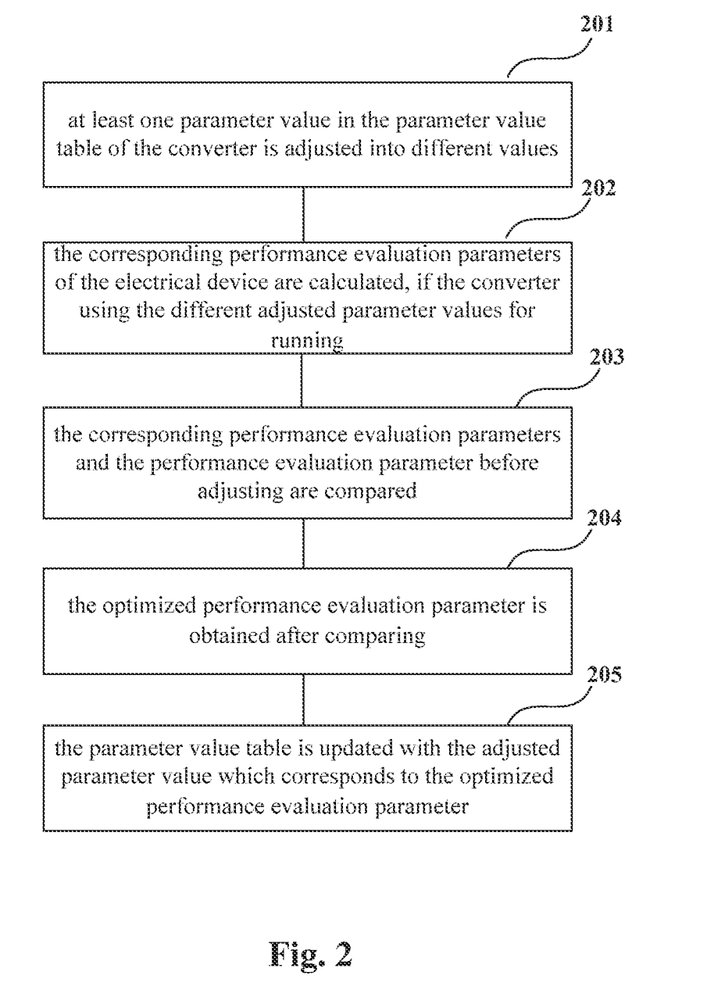
FIG. 2 is a flowchart of a block 102 with an embodiment of the present disclosure.

FIG. 2 is a flowchart of block 102 with an embodiment of the present disclosure. As shown in FIG. 2, the block 102 includes:

block 201, at least one parameter value in the parameter value table of the converter is adjusted into different values;

block 202, the corresponding performance evaluation parameters of the electrical device are calculated, if the converter using the different adjusted parameter values for running;

block 203, the corresponding performance evaluation parameters and the performance evaluation parameter before adjusting are compared;

block 204, the optimized performance evaluation parameter is obtained after comparing, block 205, the parameter value table is updated with the adjusted parameter value which corresponds to the optimized performance evaluation parameter, wherein the converter uses the updated parameter value table for running.

In an embodiment, when the input parameter changes, in block 201, each of the at least one (N, corresponding to N segments) parameter value in the parameter value table of the converter is adjusted into different M values according to the change of the input parameter. For example, when the input power increases, the parameter value ($T_{on-add}$) increases, when the input power decreases, the parameter value ($T_{on-add}$) decreases. For each parameter value in the parameter value table, it may be adjusted into different M values, so as to obtain M different parameter value tables.

In an embodiment, in block 202, assuming the adjusted parameter value table applied to the converter, the corresponding performance evaluation parameter of the electrical device is calculated. That is, it may calculate corresponding performance evaluation parameter under each adjusted parameter value table, so as to obtain M groups of performance evaluation parameters corresponding to M different parameter value tables respectively.

In an embodiment, in block 203, it may compare the M groups of performance evaluation parameters and the performance evaluation parameter before adjusting, select the best performance evaluation parameter, in block 204, the optimized (best) performance evaluation parameter is obtained after comparing, in block 205, select the parameter value table T by using which can obtain the optimized performance evaluation parameter, determine the parameter value table T as the updated parameter value table, wherein the converter uses the updated parameter value table for running.

In an embodiment, the method further includes (not shown in the figures): the adjusted at least one parameter value in the parameter value table is recorded.

Figure 3:
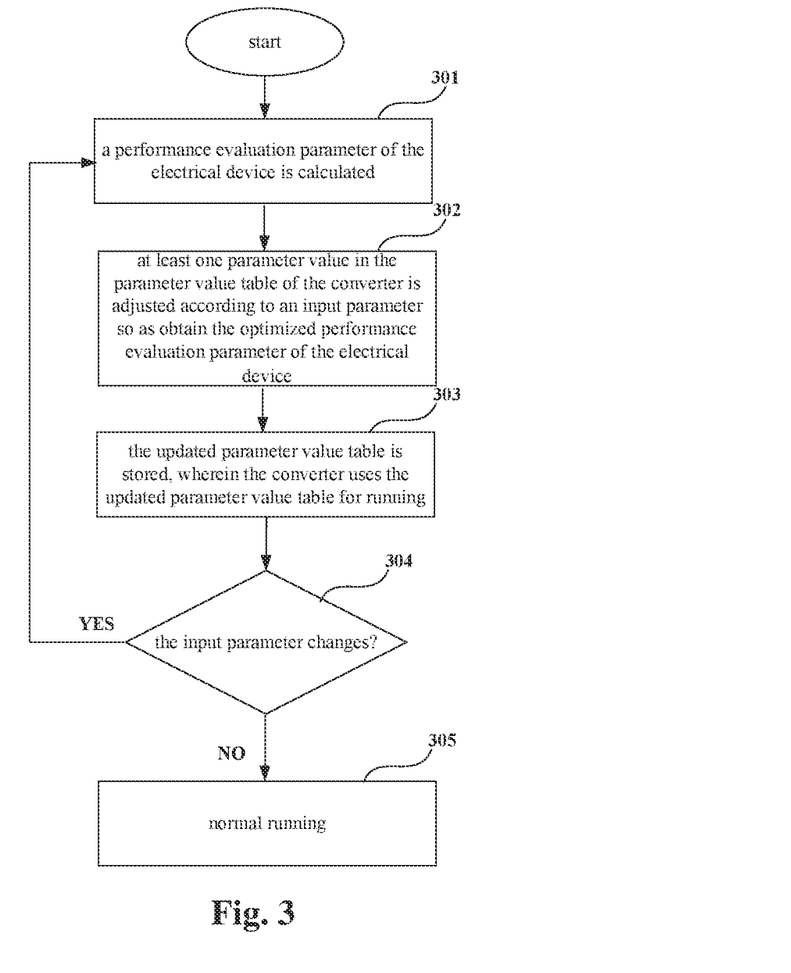
FIG. 3 is another flowchart of a method of adjusting parameter for an electrical device with an embodiment of the present disclosure.

FIG. 3 is another flowchart of a method of adjusting parameter for an electrical device with an embodiment of the present disclosure;

As shown in FIG. 3, the method includes:
- block 301, a performance evaluation parameter of the electrical device is calculated, if the converter using a parameter value table for running;
- block 302, at least one parameter value in the parameter value table of the converter is adjusted according to an input parameter so as obtain the optimized performance evaluation parameter of the electrical device;
- block 303, the parameter value table is updated with the adjusted parameter value which corresponds to the optimized performance evaluation parameter, the updated parameter value table is stored, wherein the converter uses the updated parameter value table for running.
- block 304, determining whether the input parameter changes, if yes, turn to block 301, if no, turn to 305;
- block 305, normal running.

In an embodiment, the implement of blocks 301-302 may refer to blocks 101-102 and 201-205, which shall not be described herein any further.

As can be seen from the above embodiments, the electrical device can self-adapt adjust the above mentioned table. Therefore, the self adapting parameter in the table will be enable to find the best performance for different input and load conditions and better performance of Harmonics will not limit the operation range.

Second Embodiment

An apparatus of adjusting parameter for an electrical device is provided in a second embodiment. The apparatus is corresponding to the method described in the first embodiment.

Figure 4:
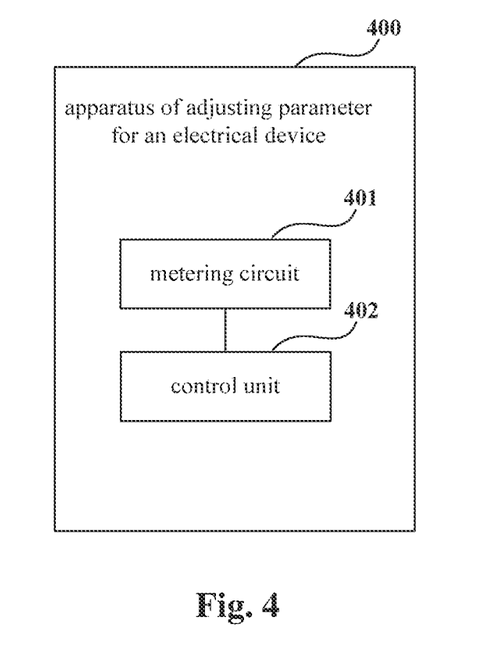
FIG. 4 is a diagram of an apparatus of adjusting parameter for an electrical device with an embodiment of the present disclosure.

FIG. 4 is a diagram of an apparatus of adjusting parameter for an electrical device with an embodiment of the present disclosure.

As shown in FIG. 4, the electrical device comprising a converter, an apparatus 400 includes:
- a metering circuit 401 configured to calculate a performance evaluation parameter of the electrical device, when the converter using a parameter value table for running;
- a control unit 402 configured to at least one parameter value in the parameter value table of the converter according to an input parameter so as obtain the optimized performance evaluation parameter of the electrical device and use the adjusted parameter value table corresponding to the optimized performance evaluation parameter for running.

In an embodiment, the performance evaluation parameter comprising at least one of Power Factor (PF), Total Harmonic Distortion (THD) and Harmonics value.

In an embodiment, the converter comprising a switching means which is coupled to an inductance, used for charging and discharging the inductance, wherein the switching means is switched to an on state for a $T_{on}$ time, and the $T_{on}$ time is dependent on the parameter value.

In an embodiment, the input parameter includes at least one of input power, input voltage and input frequency.

In an embodiment, the parameter value table includes a plurality of parameter values corresponding to different input voltages respectively.

In an embodiment, the control unit 402 further configured to determine whether the input parameter changes and calculate a performance evaluation parameter and adjust at least one parameter value in the parameter value table when the input parameter changes.

In an embodiment, when the control unit 402 adjusts at least one parameter value in the parameter value table of the converter into different values, the metering circuit further configured to calculate the corresponding performance evaluation parameters of the electrical device, if the converter using the different adjusted parameter values for running; then the control unit further configured to compare the corresponding performance evaluation parameters and the performance evaluation parameter before adjusting and obtain the optimized performance evaluation parameter; wherein, the converter 402 then updates the parameter value table with the adjusted parameter value which corresponds to the optimized performance evaluation parameter and uses the updated parameter value table for running.

In an embodiment, the control unit 402 further configured to record the adjusted at least one parameter value in the parameter value table.

In an embodiment, functions of the metering circuit 401, control unit 402 may be corresponding to the steps of the method in the first embodiment, and shall not be described herein any further.

In an embodiment, the metering circuit 401 may be a power metering integrated circuit. The circuit topology of the power metering integrated circuit may refer to a prior art, which shall not be described herein any further.

In an embodiment, the control unit 402 may be a Microcontroller Unit (MCU) or Single Chip Microcomputer. The structure of the MCU may refer to a prior art, which shall not be described herein any further.

In an embodiment, the metering circuit 401 is connected to the control unit 402, after the metering circuit 401 calculates the performance evaluation parameter, the metering circuit 401 sends the performance evaluation parameter to the control unit 402, and the control unit 402 can self-adapt adjust the above mentioned table.

As can be seen from the above embodiments, the electrical device can self-adapt adjust the above mentioned table. Therefore, the self adapting parameter in the table will be enable to find the best performance for different input and load conditions and better performance of Harmonics will not limit the operation range.

Third Embodiment

An electrical device is provided in a third embodiment. The electrical device includes the apparatus of adjusting parameter for an electrical device described in the second embodiment.

In an embodiment, the electrical device is used for a light-emitting means, for example, a gas discharge lamp, a fluorescent lamp or another fluorescent light-emitting means or LEDs. The electrical device may be a driver to receive dimming commands and/or output current and voltage to drive the light-emitting means, and adjust the luminescent intensity of a light-emitting means.

Figure 5:
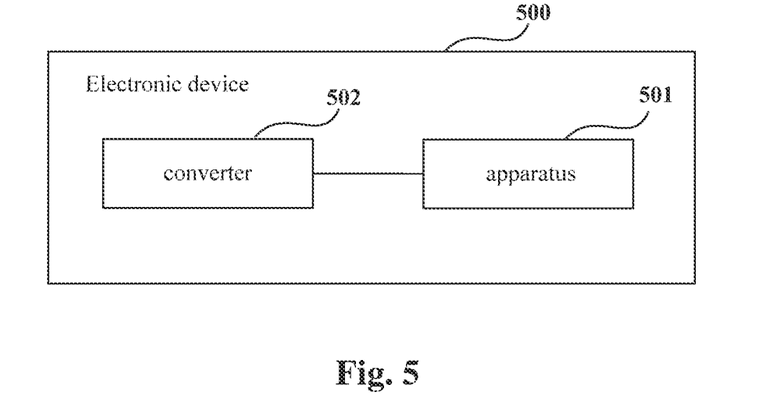
FIG. 5 is a schematic diagram of an electronic device with an embodiment of the present disclosure.

FIG. 5 is a schematic diagram of an electronic device with an embodiment of the present disclosure; As shown in FIG. 5, an electronic device 500 includes:

an apparatus 501 and a converter 502 configured to provide constant current.

In an embodiment, the apparatus 501 is identical to the apparatus 400 described in the second embodiment, which shall not be described herein any further.

In an embodiment, functions of the converter 502 may be realized with any existing method.

In this embodiment, the electronic device 500 does not necessarily include all the parts shown in FIG. 5. Also, this figure is illustrative only, and other types of structures may also be used, so as to supplement or replace this structure and achieve a telecommunications function or other functions.

A converter is also provided in a third embodiment. The converter includes the apparatus of adjusting parameter for an electrical device described in the second embodiment.

Figure 6:
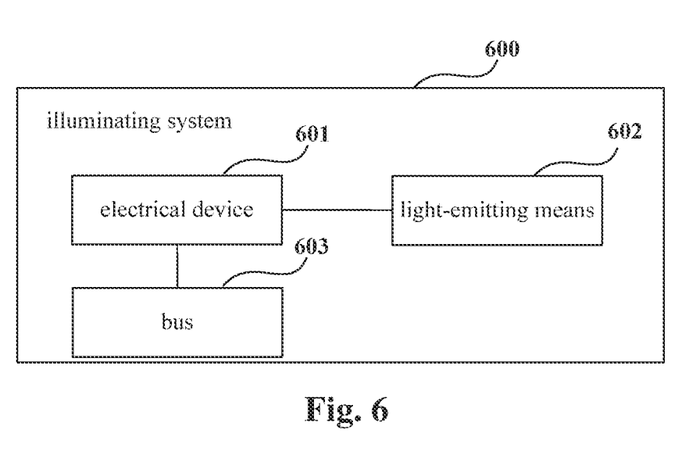
FIG. 6 is a block diagram of an illuminating system with an embodiment of the present disclosure.

FIG. 6 is a block diagram of an illuminating system with an embodiment of the present disclosure. As shown in FIG. 6, the illuminating system includes an electrical device 601, a light-emitting means 602. The light-emitting means 602 can include, for example, a gas discharge lamp, a fluorescent lamp or another fluorescent light-emitting means or LEDs. The electrical device 601 can be connected to a bus 603 or a wireless communication system in order to receive dimming commands and/or output current and voltage to drive the light-emitting means 602, and adjust the luminescent intensity of a light-emitting means 602.

In an embodiment, the electrical device 601 is identical to the electrical device 500 described in the third embodiment, which shall not be described herein any further.

As can be seen from the above embodiments, the electrical apparatus is restarted or switched off when the efficiency is determined as abnormal. Therefore, an abnormal efficiency protection is performed automatically and the performance of the electrical apparatus can be ensured. Furthermore, no additional hardware or electronic element is needed, thus the cost and space may be saved.

Generally, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of adjusting parameter for an electrical device, the electrical device comprising a converter, the method comprising:
    calculating a performance evaluation parameter of the electrical device, when the converter using a parameter value table for running;
    adjusting at least one parameter value in the parameter value table of the converter according to an input parameter so as obtain an optimized performance evaluation parameter of the electrical device and use the adjusted parameter value table corresponding to the optimized performance evaluation parameter for running;
    wherein, the step of adjusting at least one parameter value in the parameter value table of the converter according to an input parameter so as obtain the optimized performance evaluation parameter of the electrical device further comprises:
    adjusting at least one parameter value in the parameter value table of the converter into different values;
    calculating the corresponding performance evaluation parameters of the electrical device, if the converter using the different adjusted parameter values for running;
    comparing the corresponding performance evaluation parameters and the performance evaluation parameter before adjusting and obtaining the optimized performance evaluation parameter;
    updating the parameter value table with the adjusted parameter value which corresponds to the optimized performance evaluation parameter.

2. The method according to claim 1, wherein the performance evaluation parameter comprising at least one of Power Factor (PF), Total Harmonic Distortion (THD) and Harmonics value.

3. The method according to claim 1, wherein the input parameter comprising at least one of input power, input voltage and input frequency.

4. The method according to claim 1, wherein the parameter value table comprising a plurality of parameter values corresponding to different input voltages respectively.

5. The method according to claim 1, wherein, the method further comprises:
    determining whether the input parameter changes; and,
    calculating a performance evaluation parameter and adjusting at least one parameter value in the parameter value table when the input parameter changes.

6. The method according to claim 1, wherein, the method further comprises:
    recording the adjusted at least one parameter value in the parameter value table.

7. An apparatus of adjusting parameter for an electrical device, the electrical device comprising a converter, the apparatus comprising:
    a metering circuit configured to calculate a performance evaluation parameter of the electrical device, when the converter using a parameter value table for running;
    a control unit configured to at least one parameter value in the parameter value table of the converter according to an input parameter so as obtain an optimized performance evaluation parameter of the electrical device and use the adjusted parameter value table corresponding to the optimized performance evaluation parameter for running;
    wherein when the control unit adjusts at least one parameter value in the parameter value table of the converter into different values, the metering circuit further configured to calculate the corresponding performance evaluation parameters of the electrical device, if the converter using the different adjusted parameter values for running; then the control unit further configured to compare the corresponding performance evaluation parameters and the performance evaluation parameter before adjusting and obtain the optimized performance evaluation parameter; wherein, the converter then updates the parameter value table with the adjusted parameter value which corresponds to the optimized performance evaluation parameter and uses the updated parameter value table for running.

8. The apparatus according to claim 7, wherein the performance evaluation parameter comprising at least one of Power Factor (PF), Total Harmonic Distortion (THD) and Harmonics value.

9. The apparatus according to claim 7, wherein the input parameter comprising at least one of input power, input voltage and input frequency.

10. The apparatus according to claim 7, wherein the parameter value table comprising a plurality of parameter values corresponding to different input voltages respectively.

11. The apparatus according to claim 7, wherein, the control unit further configured to determine whether the input parameter changes and calculate a performance evaluation parameter and adjust at least one parameter value in the parameter value table when the input parameter changes.

12. The apparatus according to claim 7, wherein, the control unit further configured to record the adjusted at least one parameter value in the parameter value table.

13. The electrical device, comprising:
the apparatus according to claim 7; the converter configured to provide constant current.

14. The electrical device according to claim 13, wherein, the electrical device is an LED driver.

* * * * *

UNITED STATES PATENT AND TRADEMARK OFFICE
CERTIFICATE OF CORRECTION

PATENT NO. : 12,009,736 B2
APPLICATION NO. : 17/281630
DATED : June 11, 2024
INVENTOR(S) : Yaofeng Lin et al.

It is certified that error appears in the above-identified patent and that said Letters Patent is hereby corrected as shown below:

In the Claims

Claim 1, Column 10, Line 10, insert -- to -- between "as" and "obtain";

Claim 1, Column 10, Line 17, insert -- to -- between "as" and "obtain";

Claim 7, Column 10, Line 59, insert -- to -- between "as" and "obtain";

Claim 11, Column 12, Line 6, After "unit" insert -- is --;

Claim 12, Column 12, Line 11, After "unit" insert -- is --.

Signed and Sealed this
Sixteenth Day of July, 2024

Katherine Kelly Vidal
*Director of the United States Patent and Trademark Office*